United States Patent [19]
Vincent

[11] Patent Number: 4,858,098
[45] Date of Patent: Aug. 15, 1989

[54] SPLIT-DIODE HIGH-VOLTAGE TRANSFORMER

[75] Inventor: Joel Vincent, Gray, France

[73] Assignee: Societe Orega Electronique et Mecanique, Paris, France

[21] Appl. No.: 262,218

[22] Filed: Oct. 21, 1988

Related U.S. Application Data

[63] Continuation of Ser. No. 9,723, Feb. 2, 1987, abandoned.

[30] Foreign Application Priority Data

Feb. 4, 1986 [FR] France ................................ 86 01526

[51] Int. Cl.$^4$ .............................................. H02M 1/14
[52] U.S. Cl. ........................................ 363/45; 363/68; 363/126
[58] Field of Search ..................... 363/44, 45, 68, 126; 336/69

[56] References Cited

U.S. PATENT DOCUMENTS

| | | | |
|---|---|---|---|
| 3,886,434 | 5/1975 | Schreiner | 363/68 |
| 3,936,719 | 2/1976 | Miyoshi et al. | 363/126 |
| 4,229,787 | 10/1980 | Thibodeau | 363/126 |
| 4,247,889 | 1/1981 | Riechmann | 363/126 |
| 4,315,306 | 2/1982 | Tol et al. | 363/126 |
| 4,638,220 | 1/1987 | Beutel | 363/126 |
| 4,660,139 | 4/1987 | Nellen et al. | 363/68 |

FOREIGN PATENT DOCUMENTS 59-143477 8/1984 Japan .

*Primary Examiner*—Patrick R. Salce
*Assistant Examiner*—Jeffrey Sterrett
*Attorney, Agent, or Firm*—Oblon, Spivak, McClelland, Maier & Neustadt

[57] ABSTRACT

To obtain a ripple-free direct-current focusing voltage in a split-diode technology high-voltage transformer, the tap is made not at the middle point of the second section of the secondary winding but at a point determined by the ratio of the stray capacitances of the two half-windings of this section, and it is directly linked to a high-value resistor.

5 Claims, 3 Drawing Sheets

SPLIT-DIODE HIGH-VOLTAGE TRANSFORMER

This application is a continuation of application Ser. No. 9,723, filed on Feb. 2, 1987, now abandoned.

BACKGROUND OF THE INVENTION

1. Field of the Invention

The present invention pertains to a split-diode technology high-voltage transformer, especially for a trichromatic cathode tube.

2. Description of the Prior Art

In a split-diode technology high-voltage transformer, i.e. a transformer of the secondary winding type comprising two or more sections separated by diodes, a tap is made on the middle point of one of the sections to draw off the voltage needed to supply the pre-focusing grids of the cathode tube, the anode of which is powered by the extra-high voltage of the transformer.

However, this voltage drawn off at the middle point is a ripple voltage, the voltages at the terminals of the two half-windings of this section being disymmetrical owing to the existence of various stray capacitances which affect these two half-windings.

To reduce this ripple, an additional capacitor can be mounted in parallel on the winding which displays the weakest stray capacitance in such a way as to symmetrize the wave forms produced by the two half-windings, but a method of this type is not valid for mass production since it is generally necessary to adjust the value of the additional capacitor to each transformer, for the stray capacitances of the transformers from one and the same production batch are not constant.

SUMMARY OF THE INVENTION

The object of the present invention is a high-voltage transformer which, using simple means which are easy to set up in mass production conditions, displays a direct-current voltage which is practically free of ripple at the middle point of a secondary winding.

The object of the present invention is also a high-voltage transformer of this type, the conductor of which, starting from the said middle point, radiates practically no field, even if it is not coated, and brings practically no stray capacitance to the transformer.

In the split-diode high-voltage transformer of the invention, a transformer of the secondary winding type having at least one coil section with a tap designed to give a direct voltage without using rectifier circuits, the said tap is made at one point of the said coil section which divides this section into two parts, the winding ratio of which is substantially equal to the value of the reverse ratio of the stray capacitances of both halves of the transformer section.

Advantageously, this connector is directly linked to a resistor with a high ohm value of, preferably, at least one megohm.

BRIEF DESCRIPTION OF THE DRAWINGS

The present invention will be better understood from the detailed description of a mode of embodiment, taken as a non-exhaustive example, and illustrated by the appended drawings, of which.

DESCRIPTION OF THE PREFERRED EMBODIMENT

Figure 1:
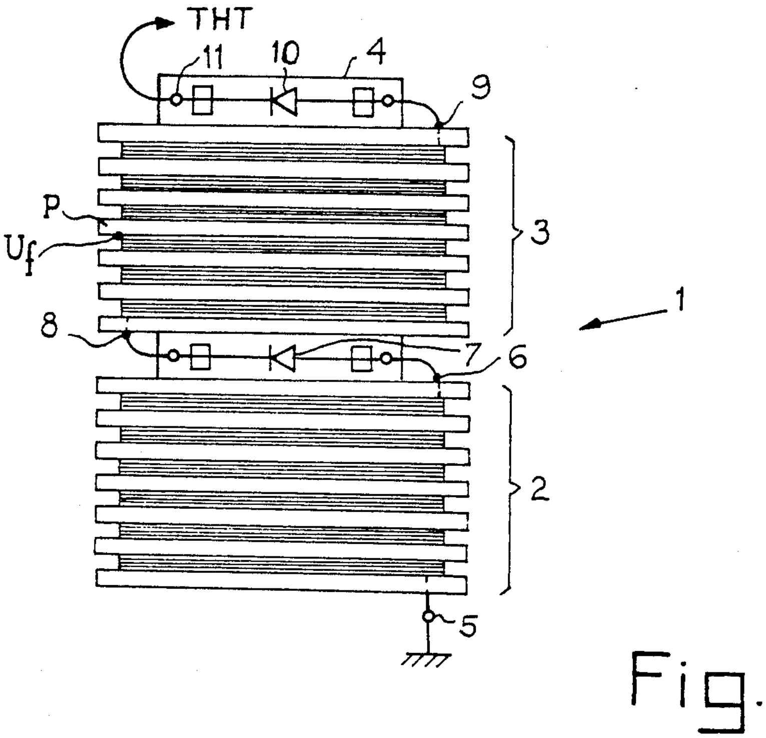
Fig.1 PRIOR ART
FIG. 1 is a simplified front view of a secondary winding of a conventional high-voltage transformer coil.

The high-voltage transformer described below is designed to power a trichromatic television cathode tube, but it is understood that the invention can be applied to any high-voltage transformer comprising at least one coil section at the middle point of which a voltage is tapped which must be a direct-current voltage without the use of any rectifier or filtering capacitors.

The secondary winding 1 of the high-voltage transformer depicted in the drawing comprises two coil sections, 2,3, which are physically separated, arranged on a common support 4, beside one another.

Figure 2:
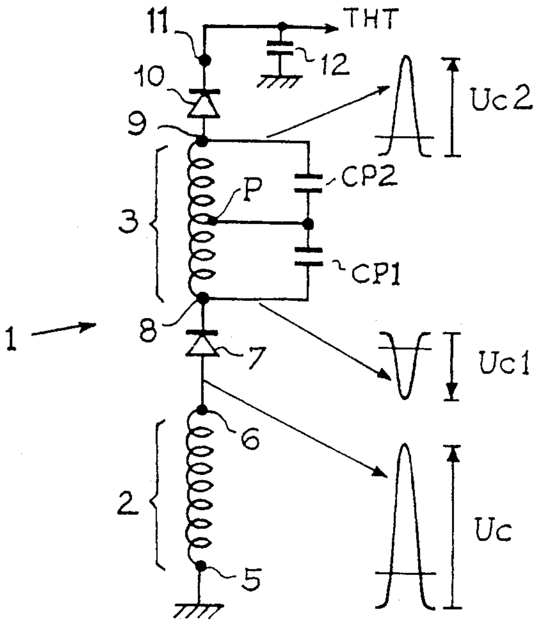
Fig.2 PRIOR ART
FIG. 2 is an electrical diagram of the secondary winding of the transformer of FIG. 1.

The end 5 of the section 2 which is furthest from the section 3 is designed to be linked to the ground, while its other end 6 is linked by a diode 7 fixed to the support at the end 8 which is the closest to the section 3. The other end 9 of the section 3 is linked by a diode 10 to an output terminal 11 which is, itself, linked by an extra-high voltage (EHV) output cable designed to be connected to the anode of a trichromatic cathode tube (not depicted). The capacitance displayed by this cathode tube is symbolized by a capacitor 12 (FIG. 2): this capacitor 12 forms a rectifying and smoothing circuit with the diode 10. The focusing voltage $U^f$ is drawn off at a point P located in the middle of the section 3. If, for example, as depicted in the drawing, the section 3 comprises six pancake coils separated by insulating disks, the point P is obviously located between the third part and the fourth part.

With respect to the middle point P, the terminals 8 and 9 display stray capacitances CP1 and CP2 respectively. UC1 and UC2 are taken to be the moduli of the voltages at the terminals of CP1 and CP2 respectively, and Uc the modulus of the voltage between the point 6 and the ground.

In one mode of embodiment, values of 12pF and 6pF respectively were found for CP1 and CP2.

Although the two half-windings of section 3, determined by the middle point P, have a practically identical inductance, the moduli UC1 and UC2 are influenced by the different values of CP1 and CP2. The greater the stray capacitance, the more limited is the modulus, as can be easily determined in a vectorial representation of the constituents of inductive and capacitive voltages. Consequently, the resultant voltage at the point P is not a pure direct-current voltage but a ripple voltage, a fact that jeopardizes the proper functioning of the circuits connected downstream of the point P, as specified above in the introduction.

Figure 3:
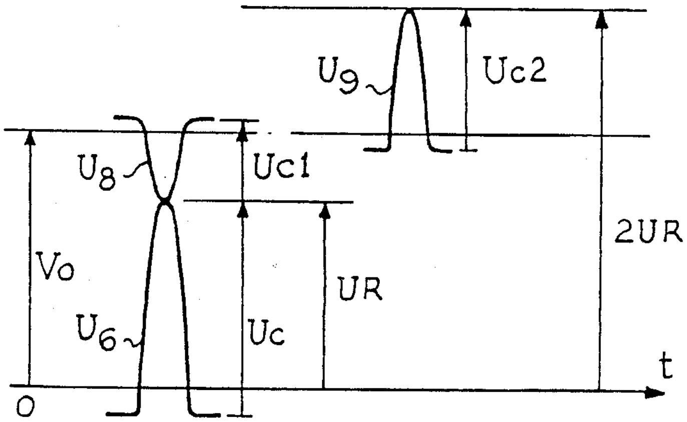
Fig. 3 PRIOR ART
FIG. 3 is a diagram of the wave shapes of the winding of FIG. 2.
Figure 4:
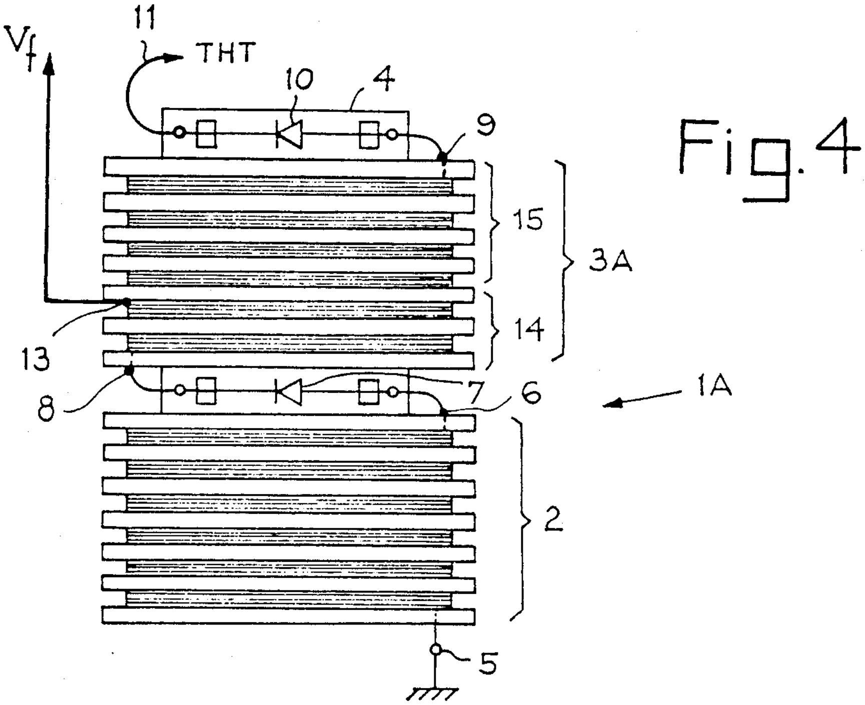
FIG. 4 is a simplified front view of a secondary winding of a high-voltage transformer coil according to the invention.
Figure 5:
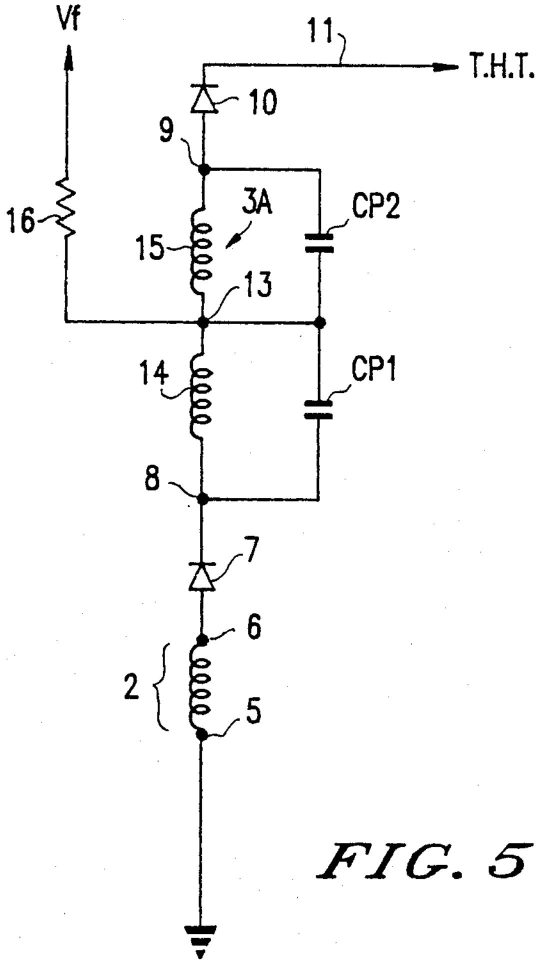
FIG. 5 is an electrical diagram of the secondary winding of the transformer of FIG. 4.

FIG. 3 depicts the curve, in time, of the voltages U6, U8 and U9 at the points 6, 8 and 9 respectively, in relation to the earth (connected to the point 5), the voltage U9 being shifted in time with respect to the two other voltages for the clarity of the drawing. The mean value of the ripple voltage in P has been marked $V^o$, and the modulus of U6 in relation to the ground has been marked UR. The value of the modulus of the direct-current voltage obtained at the point 10 is equal to 2UR and results from the composition of all three voltages U6, U8 and U9.

According to the invention, rather than adding a parallel ancillary capacitor to CP2, with a capacitance equal to CP1−CP2, the positioning of the tap on the section 3 is modified.

The tap is made at a point 13 determined as follows. *3a* is taken to be the second winding section (between the points 8 and 9) of the secondary winding 1A comprising a tap 13 of this type, and 14, 15 are taken to be the parts of the section *3a* between the points 8, 13 and 13, 9 respectively. N1 and N2 are taken to be the number of winding turns of the parts 14 and 15 respectively. With the stray capacitances that could be had for the two half-windings between the points 8,P and P,9 (the point P being used then only to measure these stray capacitances) still bearing the references CP1 ad CP2 respectively, the point 13 is such that:

$$\frac{N1}{N2}\ \frac{CP2}{CP1}$$

Taking up the above exampel with CP1=12pF and CP2=6pF, we get N1/N2=6/12=½, i.e. the point 13 is positioned at one-third of the winding 3A comprising six pancake coils separated by the insulating disks and series-connected, the point 13 is located at the junction between the second and third pancakes starting from the point 8. Tests have shown that the position of the point 13 is not of vital importance and that if, for reasons of simpler manufacturing, the closest point theoretically determined by the value of the ratio N1/N2 were to be taken at the junction of the two pancakes, there would be a substantial reduction in the ripple of the voltage drawn off at this point. In practice, the mean CP1m and CP2m is taken of the measurements of CP1 and CP2 made on several transformers from one and the same production batch, since these values vary from one transformer to another in the same batch. Even if the reduction of the ripple is not then the highest possible for certain transformers in the batch, the characteristic of the invention explained below makes it possible to improve the result.

tion, a resistor 16 with a high value of at least one megohm for example, is directly connected to the point 13. This resistor 16 is set as closely as possible to the point 13 and may be advantageously included in the coating of the transformer coil.

Through this resistor 16, an additional stray capacitance, which might unbalance the distribution of the stray capacitances at this point, is prevented from being taken to the level of the point 13. Furthermore, this resistor 16 prevents the uncoated linking wire which is connected to it and which conveys the focusing voltage V*f* up to the potentiometric unit which may be at a distance from the transformer, from radiating and disturbing the television set into which it is fitted, since this resistor forms a filtering circuit with the stray capacitances distributed downstream. Finally, by appropriately choosing the value of this resistor, the focusing voltage can be easily pre-adjusted.

What is claimed is:

1. A split-diode technology, high-voltage transformer for trichromatic cathode tube of the secondary winding type wherein said secondary comprises:

two sections having at least one of said coil section with a tap, providing directly at said tap a direct-current voltage, wherein this tap is made at one point of the said coil section which divides this section into two parts wherein the ratio of the number of turns in the winding is substantially equal to the value of the reverse ratio of the stray capacitances, which are the mean value of the capacitance, among the values of stray capacitances, which are contained within a given production batch of that section of the secondary of the transformer which contains said tap.

2. A transformer according to claim 1 comprising:

in the said section, several pancake coils wherein the tap is made at the junction of the two pancake coils which are closest to the theoretical point.

3. A transformer according to claim 1 wherein a resistor with a high ohm value is directly connected to the tap.

4. A transformer according to claim 3 wherein the resistor is included in the coating of the transformer coil.

5. A transformer according to the claim 3 wherein the resistor has a value of at least one megohm.

* * * * *